United States Patent [19]
Nath

[11] Patent Number: 5,857,052
[45] Date of Patent: Jan. 5, 1999

[54] LIGHTGUIDE FILLED WITH A LIQUID CONTAINING DIMETHYLSULFOXIDE

[76] Inventor: Günther Nath, Otto-Heilmann-Strasse 3, D-82031 Grünwald, Germany

[21] Appl. No.: 899,598

[22] Filed: Jul. 24, 1997

[51] Int. Cl.⁶ .................................................. G02B 6/20
[52] U.S. Cl. ........................... 385/125; 385/141; 385/142
[58] Field of Search .......................... 385/125, 141–143, 385/901; 362/32

[56] References Cited

U.S. PATENT DOCUMENTS

| | | | |
|---|---|---|---|
| 4,009,382 | 2/1977 | Nath | 385/125 |
| 4,747,662 | 5/1988 | Fitz | 385/125 |
| 5,412,750 | 5/1995 | Nath | 385/125 |
| 5,675,689 | 10/1997 | Nath | 385/125 |
| 5,737,473 | 4/1998 | Nath | 385/125 |

*Primary Examiner*—Phan T. H. Palmer
*Attorney, Agent, or Firm*—Venable; Gabor J. Kelemen

[57] ABSTRACT

Liquid lightguide having a cladding made from a tube of fluorocarbon resin and filled with a light conducting liquid containing dimethylsultoxide (DMSO).

11 Claims, 1 Drawing Sheet

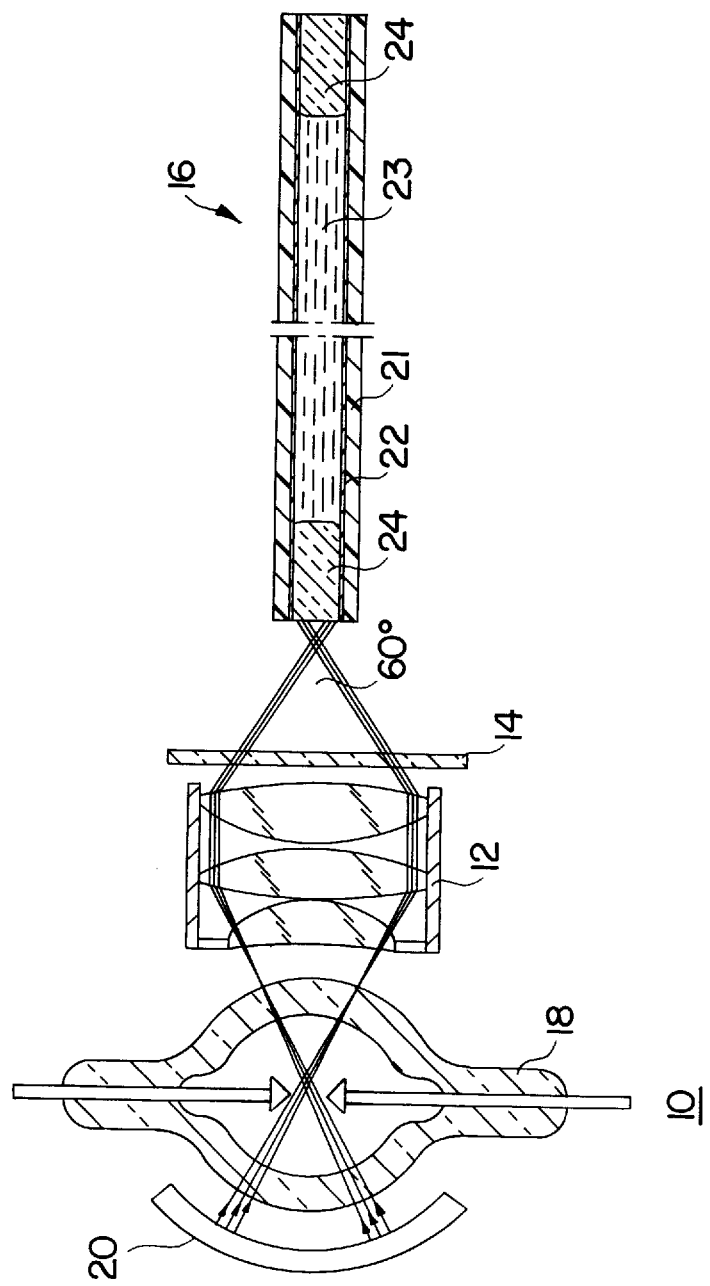

LIGHTGUIDE FILLED WITH A LIQUID CONTAINING DIMETHYLSULFOXIDE

BACKGROUND OF THE INVENTION

The present invention relates to a lightguide including a plastic tube, especially a tube made from carbon fluorine resin like Teflon® FEP, filled with light conducting liquid and seated on both ends by windows, made from cylindrically formed transparent plugs of glass.

A light conducting liquid for the visible spectral range must have the following properties.
a) High transparency in the spectral range between 400 and 700 nanometers, up to a length of the lightguide of 5–10 meters.
b) Photochemical stability, especially for radiation delivered by light sources being frequently used in the visible range, like tungsten halogen Incandescent lamps as for example a 150 Watt projector lamp with a cold light reflector.
c) The liquid must be physiologically safe. Since liquid lightguldes are also used in the medical endoscopy, the liquid must not be toxic o
d) The liquid should not be easily combustible or flammable.
e) The freezing point should not be higher than $-20°$ C. because the liqhtguide must also be able to be shipped during winter time. In addition the lightguide should be tunctioning also at environmental temperatures below freezing.
f) The light guiding liquid must be compatible with the material of the cladding tube. That means that the thermal expansion coefficients of liquid and tubing may not differ significantly, so that no bubbles appear in the liquid of the lightguide when the environmental temperature fluctuates between $-20°$ C. and $+50°$ C. The liquid must not attack or swell the material of the cloladding tube which consists in most cases of a carbon fluorine polymer or copolymer. I his must also apply to cases where the tube is internally lined with a thin layer of Teflon® AF.

The liquid also must not diffuse through the wall of the tubing having a thickness of typically 0.3–0.5 mm, for a time period Of Lip to several years.

To guarantee this, the liquid must have a high boiling point or/and it should be hygrosoopio.
g) The lightguldes whose major application is In the field of medical endoscopy should not be affected by sterilization processes, using ethylene oxide (ETO) as the sterilizing gas.
h) A high refractive index of the light conducting liquid is indispensable to ensure for total reflection of the radiation at the inner surface of the cladding tube, to obtain a high numerical aperture of the lightguide and as a consequence a greatest possible independence of transmission from bonding of the lightguide.

U.S. Pat. No. 4,009,382 describes a liquid lightguide with a liquid conisisting of an aqueous inorganic salt solution, In gonoral a calcium chloride solution With a high concentration resulting In a refractive index of $n=1,435$. A higher value for the refractive index would be desirable, however, a higher concentration of the salt solution would result in precipilation of salt at a temperature only a few degrees below room temperature, thus making the light guide opaque. The calcium chloride solution is hygroscopic, but the optical transmission of the corresponding liquid lightguide in the red spectral range Is insufficient, due to the high concentration of OH groups in the aqueous salt solution.

There are other liquid lightguides known from DE 3644839.7-51 where the liquid consists essentially of di-, tri-or tetra-ethylene glycol with a certain amount of water. These lightguides, too, do not allow for a higher value of the refractive Index as $n=1,445$ for the liquid core.

In addition, the concentration of OH groups, though smaller than with the aqueous salt solution, is still at such a high level that the transmission in the red spectral range at lengths of a few meters for the lightguide is not satisfying.

Another liquid lightguide has become known from DE 19508752.6, where the liquid core consists of an aqueous calcium chloride solution using, however, mainly heavy water ($D_2O$) instead of light water ($H_2O$). This lightguide has excellent transmission In the red spectral range, but the value of the refractive index is limited to $n<1.430$ and in addition, the cost of such a liquid is extremely high due to the high price for heavy water.

SUMMARY OF THE INVENTION

It is an object of the present Invention to provide a liquid lightguide that corresponds better to the requirements a)–h) than the known liquid lightguides described above.

In accordance with the present invention the light conducting liquid includes or consists of dimethylsulfoxide ($H_3C$—$SO$—$CH_3$), also referred to as DMSO.

The Hydrogen in the DMSO may be partially or totally substituted by deuterium.

DMSO has a freezing point of $18.55°$ C. and a boiling point of $189°$ C.

DMSO is hygroscopic but does not contain OH groups which would reduce the transmission In the red spectral range. As a side product of tho paper pulp production, DMSO is readily available at a reasonable price DMSO, being used in medicine as a carrier for medication Is physiologically safe. By the addition of about 15% by weight of light or heavy water the freezing point may be shifted below $-20°$ C. DMSO has a high refractive index ($n=1,48$) which is still as high as $1.46$ after the addition of the 15% by weight of water which Is considerably higher than the refractive index of the glycol/water lightguides.

Using Teflon® FEP as a cladding, the DMSO+15% $H_2O$ liquid lightguide has a numerical aperture $\sin \alpha = \sqrt{n^2 \text{core} - n^2 \text{clad}}$ as high as 0.58 resulting in a total acceptance angle of $2\alpha=71°$.

The addition of water to DMSO allows also for reduction of the internal pressure inside the FEP tubing which builds up during a time period of several months due to the hygroscopicity of the DMOS to a moderate value which in turn guarantees a long time 100 percent filling degree of the liquid liqhtguide. Using $D_2O$ instead of $H_2O$ as aqueous additive maintains tho excellent red transmission capability of the DMSO, allows for a temperature range between $-20°$ C. and $+50°$ C. for use of the lightguide and regulates the internal pressure of the lightguide resulting in a long lifetime over A period of years. The use of only 15% by weight of the otherwise expensive $D_2O$ is still an economic way to achieve the desired functionality of the lightguide.

BRIEF DESCRIPTION OF THE DRAWING

Tho solo figure shows an illumination device with a liquid liqhtguide according to a preferred embodiment at the invention in a simplified version.

DESCRIPTION OF THE PREFERRED EMBODIMENTS

Turning to the figure, the illumination device contains a light source 10 and a liquid lightguide 16 optically coupled to the light source. The light source 10) contains, for example, a discharge lamp 18 with reflector 20 and condenser 12 and an optical filter 14 which cuts off radiation having a wave length below 380 nm and above 800 nm if only visible radiation has to be transmitted by the lightguide.

The lightguide 16 contains a tube 21 made from Teflon® FEP which is the preferred material for the tube. Tube 21 is on both ends sealed by cylindrical plugs 24 made from glass or quartz glass.

In a preferred embodiment of the invention the tube 22 is tilled with a light conducting liquid 23, which is a mixture of dimethylsulfoxide and 10 to 30, but more preferably 15±3% of heavy water ($D_2O$) by weight.

The tube 21 can be internally coated with a layer 22 made from Teflon® AF, having a thickness of 2–5$\mu$. This internal layer of Teflon® AF enhances the numerical aperture of the lightguide from 0.58 to 0.64 which I.R useful when extreme curvatures of the liquid lightguide have to be expected.

The illumination device a described above can be variod in different ways: instead of heavy water light water or a mixture of tile two can be used as an additive to the DMSO. The DMSO itself can be deuterized when a high optical transmission is desired in the near infrared spectral range.

The amount of added water can be as high as 30% by weight. A lower limit of added water Is about 10% by weight. Also, other tube materials than Teflon® FEP may be used, for example, Teflon® PFA (Dupont), Hyflon MFA (Ausimont) or other carbon fluorine polymers.

This inner surface of the lube 21, which is in contact with the liquid DMSO, should not contain the element H, but only C and F, or C, F arid O, since carbon fluorine materials containing H in addition to the elements C and F are swelled by the DMSO liquid, as is the case with the terpolymer Hostaflon TFB from Hoochst.

The light source can contain a tungsten halogen incandescent lamp, a metal halide lamp, a xenon discharge lamp or a mercury vapor pressure lamp.

What is claimed is:

1. A liquid lightguide comprising a tube made of a polymer containing carbon and fluorine; said tube being filled with a light conducting liquid containing at least partially dimethylsulfoxide.

2. The liquid lightguide as defined in claim 1, wherein said light conducting liquid contains water.

3. The liquid lightguide as defined in claim 2, wherein the water is at least partially $D_2O$.

4. The liquid lightguide as defined in claim 1, wherein said light conducting liquid contains water between 10 and 20% by weight.

5. The liquid lightguide as defined in claim 1, wherein said light conducting liquid contains 15±3% water by weight.

6. The liquid lightguide as defined in claim 1, wherein said light conducting liquid contains water up to 30% by weight.

7. The liquid lightguide as defined in claim 1, wherein said dimethlysulfoxide is deuterated.

8. The liquid lightguide as defined in claim 1, wherein said tube is of carbon fluorine void of hydrogen.

9. The liquid lightguide as defined in claim 1, wherein said tube is teflon FEP.

10. The liquid lightguide as defined in claim 1, wherein said tube is internally coated with Teflon AF.

11. The liquid lightguide as defined in claim 1, further comprising a cylindrical glass plug obturating an end of said tube; said plug having an end face coated with a dielectric film reflecting light below $\lambda$=370 nm and transmitting light in a visible range between 400 and 750 nm.

* * * * *

UNITED STATES PATENT AND TRADEMARK OFFICE
CERTIFICATE OF CORRECTION

PATENT NO. : 5,857,052
DATED : January 5, 1999
INVENTOR(S) : Gunther Nath

It is certified that error appears in the above-indentified patent and that said Letters Patent is hereby corrected as shown below:

```
    On the title page, item [30], which has been omitted,
should read --Foreign Application Priority Data
      Jul. 24, 1996  [DE]  Germany   196 29 706.0--.
```

Signed and Sealed this

Twenty-sixth Day of October, 1999

Attest:

Attesting Officer

Q. TODD DICKINSON

Acting Commissioner of Patents and Trademarks